(12) United States Patent
Allen et al.

(10) Patent No.: US 9,334,702 B2
(45) Date of Patent: May 10, 2016

(54) SELECTIVELY DISENGAGABLE SEALING SYSTEM

(75) Inventors: Jason A. Allen, Houston, TX (US);
Nicholas J. Clem, Houston, TX (US);
Robert S. O'Brien, Katy, TX (US);
Aaron C. Hammer, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 294 days.

(21) Appl. No.: 13/308,760

(22) Filed: Dec. 1, 2011

(65) Prior Publication Data

US 2013/0140041 A1    Jun. 6, 2013

(51) Int. Cl.
| | |
|---|---|
| *E21B 33/10* | (2006.01) |
| *E21B 23/06* | (2006.01) |
| *E21B 43/04* | (2006.01) |

(52) U.S. Cl.
CPC ............ *E21B 23/06* (2013.01); *E21B 43/045* (2013.01)

(58) Field of Classification Search
USPC .......... 166/387, 337, 382, 191; 277/336, 337, 277/339
See application file for complete search history.

(56) References Cited

U.S. PATENT DOCUMENTS

| | | | | |
|---|---|---|---|---|
| 4,403,922 | A * | 9/1983 | Roeder | ......................... 417/358 |
| 5,584,488 | A | 12/1996 | Lembcke | |
| 5,775,429 | A | 7/1998 | Arizmendi et al. | |
| 6,056,061 | A | 5/2000 | Ross et al. | |
| 6,302,217 | B1 * | 10/2001 | Kilgore et al. | ................ 166/382 |
| 6,565,093 | B2 | 5/2003 | Crow et al. | |
| 6,843,480 | B2 | 1/2005 | Nelson et al. | |
| 7,448,445 | B2 | 11/2008 | Doane et al. | |
| 7,490,669 | B2 | 2/2009 | Walker et al. | |
| 2003/0217844 | A1 | 11/2003 | Moyes | |
| 2007/0084605 | A1 * | 4/2007 | Walker et al. | ................. 166/313 |
| 2010/0078893 | A1 * | 4/2010 | Turnquist et al. | ............. 277/303 |
| 2010/0239415 | A1 * | 9/2010 | Turnquist et al. | .......... 415/174.2 |
| 2011/0147013 | A1 | 6/2011 | Kilgore | |

OTHER PUBLICATIONS

Weatherford, [online]; [retrieved on Jan. 11, 2012]; retrieved from the Internet http://www.weatherford.com/weatherford/groups/web/documents/weatherfordcorp/WFT071942.pdf, "Model WFX Crossover Tool," 2 pages.
International Search Report and Written Opinion for PCT Application No. PCT/US2012/062356, dated Mar. 14, 2013, pp. 1-10.

* cited by examiner

*Primary Examiner* — Taras P Bemko
(74) *Attorney, Agent, or Firm* — Cantor Colburn LLP

(57) ABSTRACT

A seal assembly including a first tubular having a sealing surface and a seal element run with the first tubular and displaced from the surface. The seal element initially has a radial dimension that forms a radially innermost or outermost sealing dimension of the first tubular for enabling the first tubular to be sealed with a second tubular radially disposed with the first tubular. A mechanism is included that is triggerable for reconfiguring the radial dimension of the seal element. The sealing surface of the first tubular operative forms the radially innermost or outermost sealing dimension of the first tubular when the radial dimension of the seal element has been reconfigured for enabling the sealing surface of the first tubular to receive a second seal element. A method of sealing tubulars is also disclosed.

15 Claims, 5 Drawing Sheets

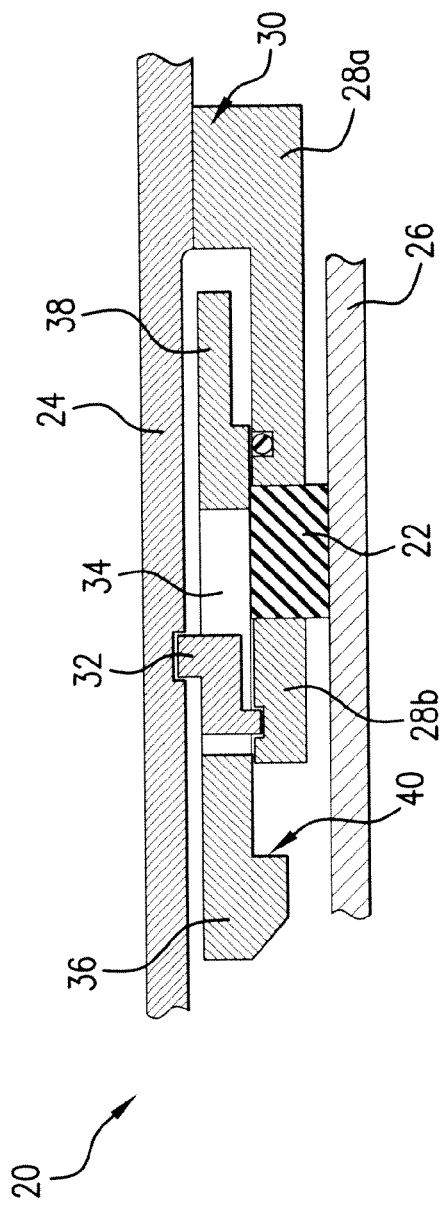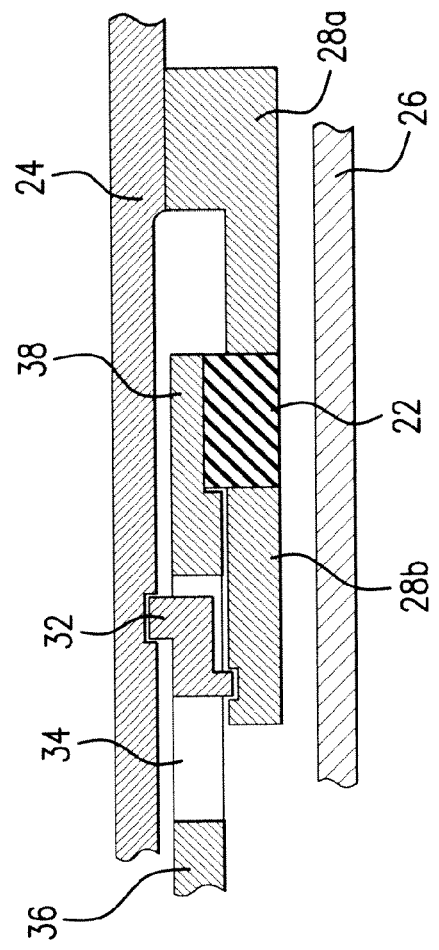

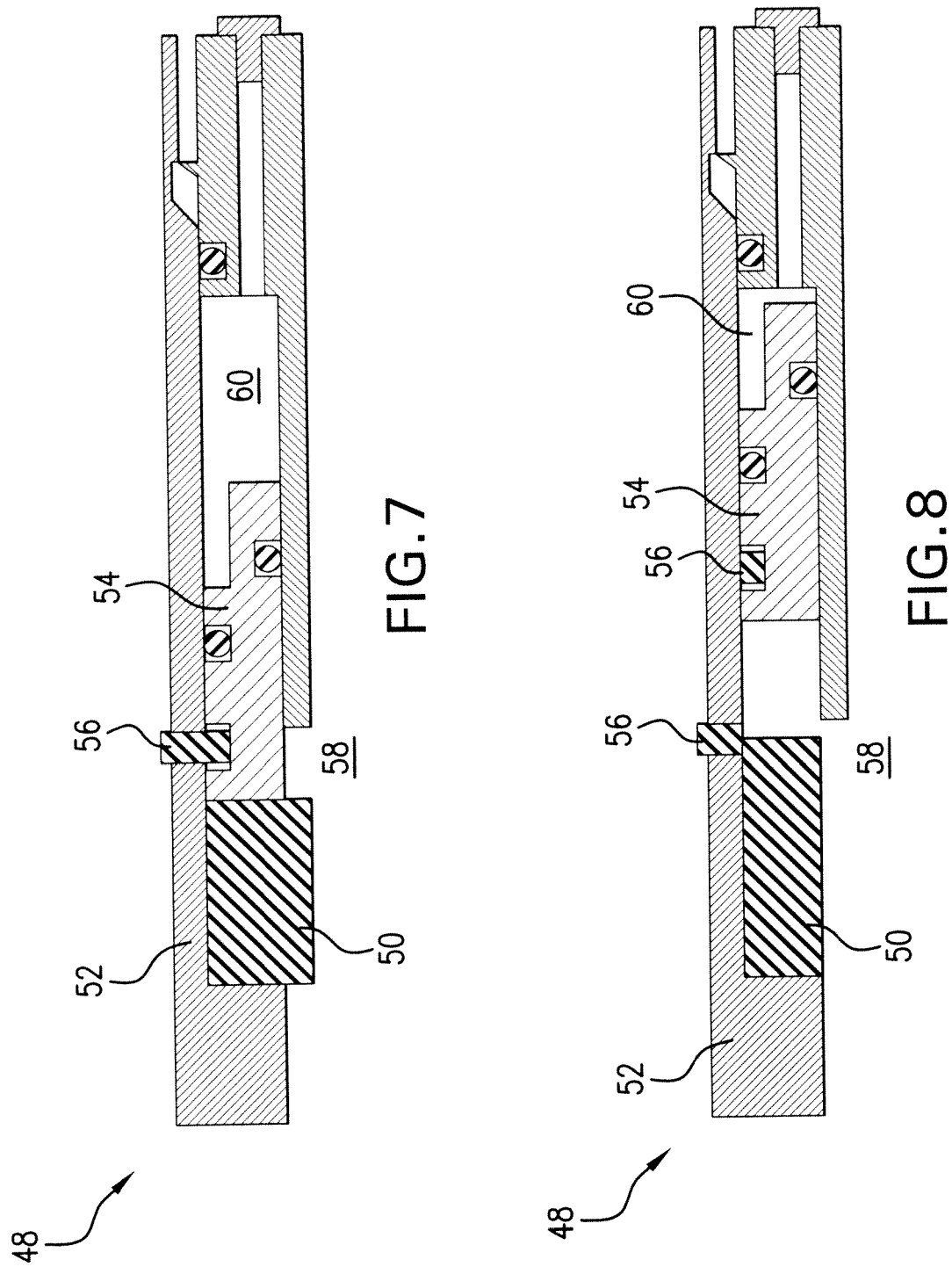

SELECTIVELY DISENGAGABLE SEALING SYSTEM

BACKGROUND

Seals are used ubiquitously in the downhole drilling and completions industry. Commonly seals are disposed on the outer surface of a radially inwardly disposed tubular. However, so-called inverted seals have gained favor for use in gravel pack operations as they enable the use of a slick outer diameter (OD) crossover tool. These slick OD crossover tools have several advantages over prior crossover tools, which include shoulders and seal elements bonded thereon that can become stuck on other components during run-in and pull out of the tool and adjacent tools. However, the inverted seals often become damaged during gravel pack operations and are unreliable during production after the crossover tool has been removed. Accordingly, the industry always well receives advances in seal technology in general and inverted seal technology specifically.

BRIEF DESCRIPTION

A seal assembly including a first tubular having a sealing surface; a seal element run with the first tubular and displaced from the surface, the seal element initially having a radial dimension that forms a radially innermost or outermost sealing dimension of the first tubular for enabling the first tubular to be sealed with a second tubular radially disposed with the first tubular; and a mechanism triggerable for reconfiguring the radial dimension of the seal element, the sealing surface of the first tubular operatively forming the radially innermost or outermost sealing dimension of the first tubular when the radial dimension of the seal element has been reconfigured for enabling the sealing surface of the first tubular to receive a second seal element.

A method of selectively sealing tubulars including sealing a seal element of a first tubular with a second tubular; performing a downhole operation; disabling the seal element by changing a radial dimension of the seal element so that it is no longer capable of sealing with the second tubular; pulling out the second tubular; and miming in a third tubular having a second seal element thereon operatively arranged for sealing against a surface of the first tubular.

BRIEF DESCRIPTION OF THE DRAWINGS

The following descriptions should not be considered limiting in any way. With reference to the accompanying drawings, like elements are numbered alike:

FIG. 3 is a quarter-sectional view of an assembly including a seal element engaged between two tubulars;

FIG. 4 is a quarter-sectional view of the assembly of FIG. 1 where axial movement of a sleeve has disabled or deactivated the seal element from sealing the tubulars;

FIG. 7 is a quarter-sectional view of an assembly including a seal element engagable between two tubulars;

FIG. 8 is a quarter-sectional view of the assembly of FIG. 7 where axial movement of a piston has disabled or deactivated the seal element from sealing between tubulars;

DETAILED DESCRIPTION

A detailed description of one or more embodiments of the disclosed apparatus and method are presented herein by way of exemplification and not limitation with reference to the Figures.

Figure 1:
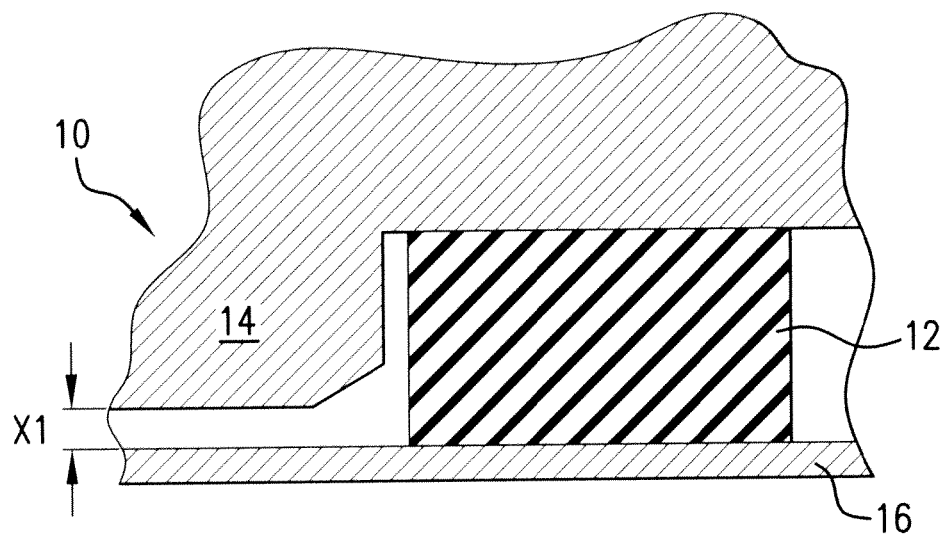
FIG. 1 is a quarter-sectional view of an assembly having a seal element engaged between two tubulars.
Figure 2:
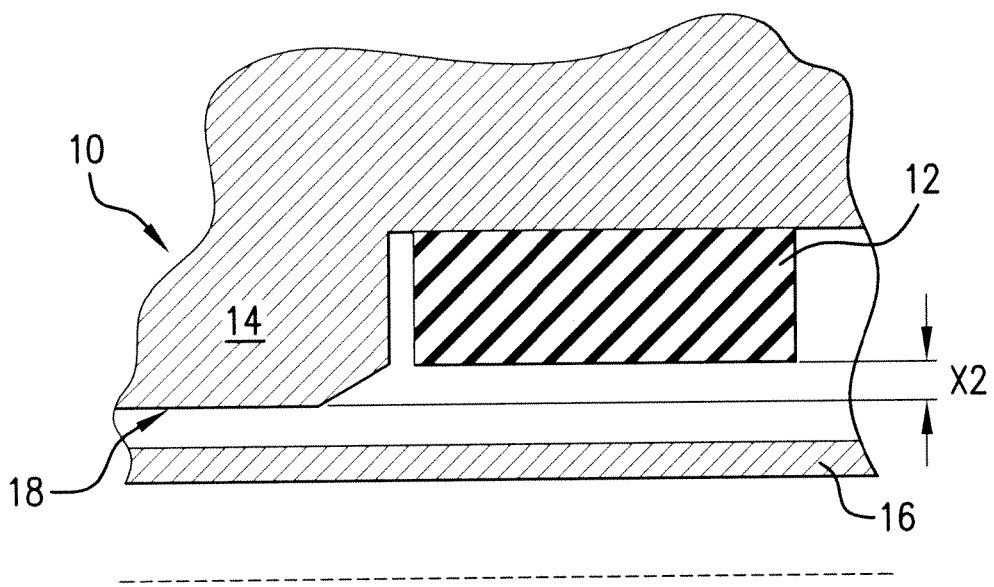
FIG. 2 is a quarter-sectional view of the assembly of FIG. 1 where the seal element is disabled or deactivated from sealing the tubulars.
Figure 5:
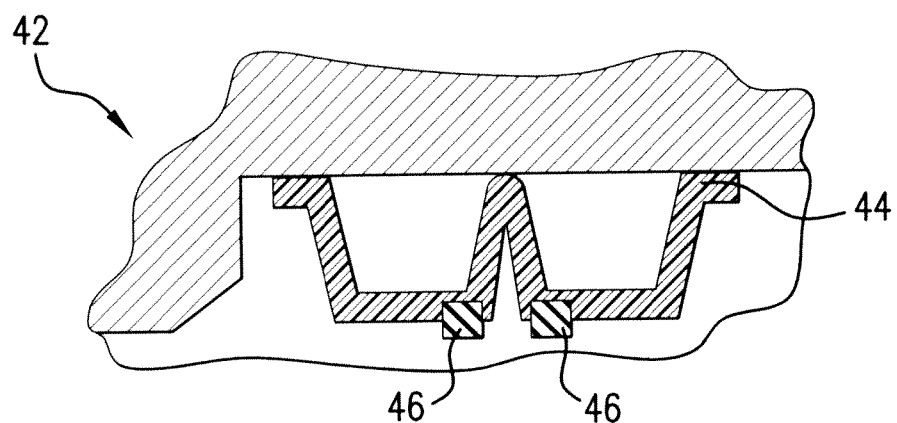
FIG. 5 is a quarter-sectional view of an assembly including a seal element engagable between two tubulars.
Figure 6:
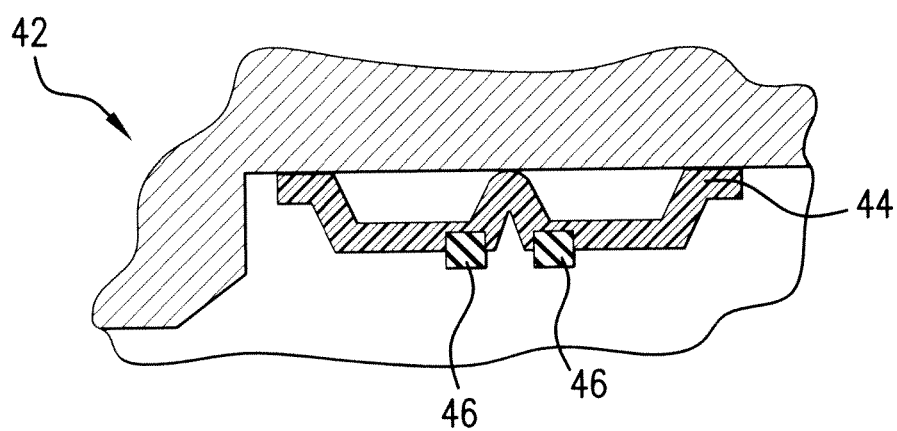
FIG. 6 is a quarter-sectional view of the assembly of FIG. 5 where axial movement of the seal element has disabled or deactivated the seal element from sealing between tubulars.

Referring now to the embodiment of FIGS. 1 and 2, a selectively disengagable or deactivatable seal assembly 10 is shown having a seal element 12. The seal element 12 is disposed with a first tubular 14 in order to form a sealed engagement with a second tubular 16. The tubular 14 is positionable radially outwardly of the tubular 16 or vice-versa. In one embodiment the seal element 12 is an inverted seal, the first tubular 14 is part of an outer tubular string, and the second tubular 16 is a crossover tool housed within the tubular 14 for performing a fracturing and/or gravel pack operation. Of course, the tubulars 14 and 16 could be other tubulars arranged differently and used for other purposes.

The assembly 10 is arranged with a mechanism for enabling the seal element 12 to selectively disengage from its sealed engagement with one or both of the tubulars 14 and 16. Various embodiments of mechanisms will be described below with respect to FIGS. 3-10, but it is now noted that mechanism is generally defined to mean any property, device, assembly, system, parameter, tool, etc., or combinations of the foregoing, which enables the seal element 12 to selectively disengage, deactivate, or disable (these terms used interchangeably herein) the sealing ability of the seal element 12. As the mechanism can take a variety of forms, it may generally be referred to herein that the mechanism is "triggered", although other terms such as actuated, activated, launched, deployed, initiated, etc. may interchangeably be used to designate that some action is being performed related to the mechanism for disengaging the seal.

FIGS. 1 and 2 schematically illustrate the seal element 12 being disengaged. Initially, the seal element 12 extends radially from the tubular 14 a distance x1 such that a radial dimension of the seal element 12 effectively defines a radially innermost or outermost dimension for the tubular 14, referred to collectively as the "radial sealing dimension" for ease in discussion. That is, in some embodiments, the radial sealing dimension is an inner diameter or an outer diameter. As the seal element 12 forms the radial sealing dimension, e.g., the seal element 12 radially protrudes from the tubular 14, the seal element 12 is arranged to form a sealed engagement with the tubular 16, as shown in FIG. 1. As a result of the mechanism being triggered (again, various embodiments described in more detail below with respect to FIGS. 3-10) the seal element 12 is changed in radial dimension, namely, moved a distance x2 from a surface 18 of the tubular 14. Thus, after triggering the mechanism, the surface 18 (or some other surface of the tubular 14) then defines the radial sealing dimension for the tubular 14, i.e., the radially innermost (or outermost) dimension. For example, the surface 18 could be formed as a seal bore for receiving a conventional style seal element run-in on an isolation string after the tubular 16, e.g., a crossover tool, is pulled out. For example, the distance x2 could be greater than or equal to zero. In some embodiments, the seal element 12 or portions thereof may extend radially beyond the tubular 14 to some relatively small or insignificant degree, but nevertheless the engagement with the tubular 16 is disabled and the surface 18 is used for resealing the tubular 14.

As noted above, one potential embodiment for use of the assembly 10 and others described herein is for sealing against a crossover tool with inverted seals during a gravel pack operation. After the operations are completed at each desired zone and the crossover tool is no longer needed, the crossover tool can be pulled out of the hole and the inverted seals disengaged or deactivated as schematically described above. After deactivation or disengagement, the inverted seals no longer form the radial sealing dimension, i.e., the innermost diameter, of the outer tubular string. Thus, the inverted seals are changed in radial dimension, e.g., moved radially, so that a typical isolation assembly can be run-in with production tubing and sealed into seal bores or the like in the outer tubular string. This avoids the disadvantages of inverted seals, which are often damaged during gravel pack operations and inherently unreliable thereafter. Of course, other seal elements, including non-inverted seals could be similarly deactivated in any desired system, although multi and single zone completions are prime candidates for the currently described assemblies.

One embodiment is shown in FIGS. 3 and 4, in which an assembly 20 is shown between an engaged and a disengaged state, respectively. The assembly 20 resembles the assembly 10 in basic concept, i.e., having a seal element 22 that is arranged for selectively disengaging from sealed engagement between a first tubular 24 and a second tubular 26. Similar to the assembly 10, the tubulars 24 could be positioned radially outwardly of the tubular 26 or vice-versa. The tubulars 24 and 26 could respectively be an outer tubular string and a crossover tool, etc. Multiple ones of the assembly 20 could be included along the length of the tubular string 24 in order to, for example, perform a multi-zone fracturing operation.

In the assembly 20, for example, the seal element 22 is held by a housing that comprises a set of rings 28a and 28b. Both of the rings 28a and 28b are secured or locked to the tubular 24. For example, in the embodiment of FIGS. 3 and 4, a threaded connection 30 and a connector 32 are utilized for respectively securing the rings 28a and 28b to the tubular 24, although other means of connection are appreciable by one of ordinary skill in the art.

The connector 32 is located in a slot 34 of a sleeve 36 for enabling the sleeve 36 to move axially with respect to the tubular 24. The seal element 22 is radially deformed (either compressed or swaged outward, depending on the relative radial orientation of the tubulars 24 and 26) into place by the sleeve 36. When radially deformed, the seal element 22 forms a sealed engagement between the tubulars 24 and 26. Upon axial movement of the sleeve 36, a narrowed portion 38 of the sleeve 36 is aligned with the seal element 22, enabling the seal element 22 to at least partially return to an orientation in which it is not deformed. That is, the seal element 22 could spring radially outward or inward toward its rest or neutral configuration. As shown in FIG. 4, when aligned with the narrowed end 38 the seal element 22 changes in radial dimension so that it no longer forms the radial sealing dimension for the tubular 24. Instead, the radial sealing dimension is formed by a surface of the rings 28a and 28b (or some other surface connected to the tubular 24). In this way, the sleeve 36 with the narrowed end 38 acts as a mechanism that can be triggered for disengagement of the seal element 22.

The sleeve 36 has, for example, a profile 40 for engaging with a complementarily profiled shifting tool in order to move the sleeve 36, although it is to be recognized that any other method of shifting the sleeve 36 could be utilized. In embodiments in which an isolation string is run-in after deactivation of the seals, such a shifting tool could be included at the leading end of the isolation string, and one or more of the assemblies 20 deactivated by, for example, setting weight down on the sleeve 36 to engage the shifting tool with the profile 40, pulling up on the isolation string to shift the sleeve 36, running the isolation string to another sleeve, etc.

It is to be appreciated that modifications to any of the assemblies described herein are possible. For example, in an embodiment similar to that of the assembly 20 the seal element is movable and the sleeve is stationary. That is, for example, with reference to the numbered components of the assembly 20, the sleeve 36 could be secured, locked to, or formed with the tubular 24 and the seal element 22 slideable therein in order to align the seal element 22 with the narrowed portion 38 of the sleeve 36.

In some embodiments, such as shown in FIGS. 3-4, axial actuation of a component, e.g. a sleeve or the seal element itself, disables the seal element. In other embodiments, rotational movement, could result in a radial change, e.g., the mechanism including or resembling a cam, four-bar linkage, camera aperture, etc. The seal element is disabled in other embodiments by removing the seal element. In some of these embodiments, the seal element is removable via physical means, such as a cutter, blade, mill, drill, etc. that is hydraulically, mechanically, gravitationally, electrically, etc. actuated for removing a portion of the seal element by cutting, shearing, etc. In some embodiments, the seal element (or a ring, c-ring, or other member or members disposed therein or secured thereto) is at least partially plastically deformable and a wedge or other component axially runnable for radially deforming or swaging the seal element. In other embodiments, the seal element is removed by spotting or delivering a fluid, such as an acid, a solvent, etc. to the seal element in order to degrade, disintegrate, dissolve, corrode, weaken, destroy, or otherwise remove the seal element or a portion thereof (collectively, "degrade"). Similarly, a change in temperature, pressure, or some other downhole condition or parameter could degrade, change the dimensions of, or otherwise trigger the mechanism for disabling the seal element. In view of these embodiments, it is clear that the term "mechanism" is used in its broadest sense, as the mechanism or components thereof may range from physical tools, e.g., a mill or blade, to the seal element itself, to a property of the seal element, e.g., dissolvability in the presence of the proper fluid.

Axial movement, e.g., of a tool, device, the seal element, etc. could be used for triggering mechanisms in various other embodiments. For example, seal elements could be included on or bonded to a barrel slip assembly, with axial movement between the interlocking jaws of the barrel slips resulting in a change in the radial positioning of the seal elements. For example, a barrel slip assembly is disclosed in U.S. Pat. No. 7,367,397 (Clemens et al.), which patent is hereby incorporated in its entirety. By placing, for example, seal elements at the inner surface of the "slip body 188" of Clemens et al., the seal elements could be selectively disengaged or disabled by moving the "annular wedge assemblies 196, 198" together and apart.

In other embodiments, axial movement enables an axially pre-compressed or axially pre-stretched or tensioned seal element to return to its rest position. For example, similar to a compression-set packer, the seal element could be compressed between two components, e.g., by a hydraulic pressure, set down weight, etc. In another such embodiment, shown in FIGS. 5 and 6, an assembly 42 includes a deformable body 44 having seal elements 46 thereon. By axially compressing and/or tensioning the body 44 between two components and/or enabling the ring 44 to return to its rest or neutral position after ceasing the compression/tension, the radial dimension of the seal elements 46 can be set.

Another such embodiment utilizing compression/tension of the seal element is shown in FIGS. 7 and 8, namely, an assembly 48. The assembly 48 includes a seal element 50. According to the embodiment of FIG. 7, the seal element 50 is initially axially compressed between a portion or component of a tubular 52 and a piston 54 for forcing the seal element 50 to compress axially and bulge radially. The piston 54 could take the form, e.g., of a ring. The piston 54 is initially held in place by a release member, shown in the form of a shear screw or pin 56, but which could take other forms, such as collet fingers, a shear ring, etc. The piston 54 is disposed between a pair of chambers 58 and 60. In one embodiment, the chamber 60 is at atmospheric or some relatively low pressure. Thus, upon pressurizing the chamber 58 to a predetermined amount, the release member will release the piston 54, e.g., the screws 56 will shear, moving the piston 54 axially and enabling the previous compressed seal element 50 to return to its rest position. In a related embodiment, the shear screws could be removed and the seal element 50 compressed by maintaining a high pressure in the chamber 60 and the seal element released by bleeding off the pressure in the chamber 60. Of course, other mechanisms could be employed that compress or tension seal elements in other ways.

Figure 9:
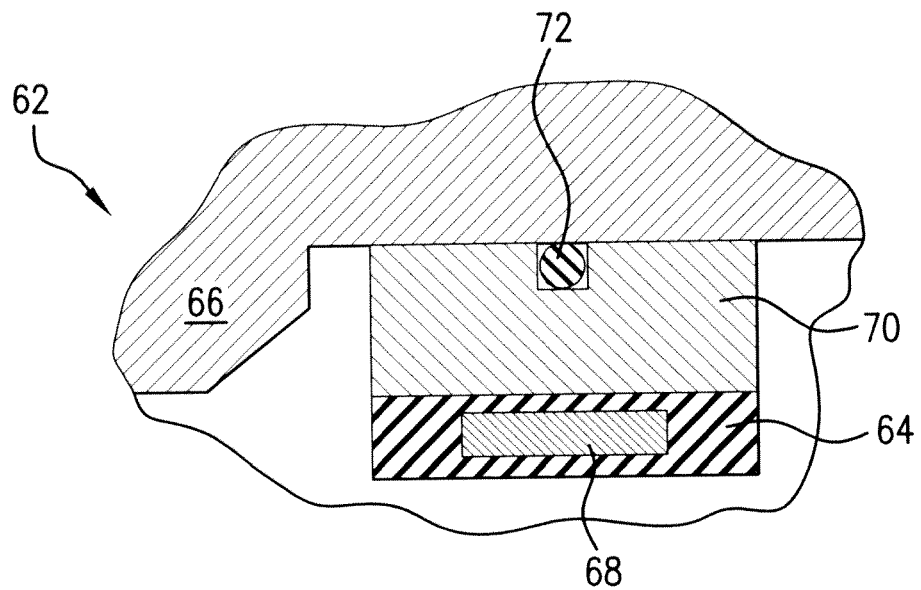
FIG. 9 is a quarter-sectional view of an assembly including a seal element engagable between two tubulars.
Figure 10:
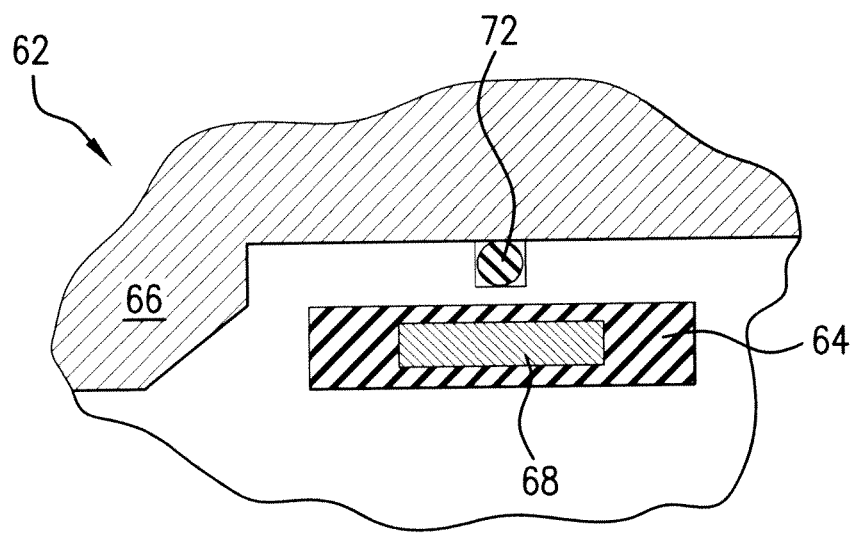
FIG. 10 is a quarter-sectional view of the assembly of FIG. 9 where removal of a support has disabled or deactivated the seal element from sealing between tubulars.

An assembly 62 is another embodiment shown in FIGS. 9 and 10. In the embodiment of the assembly 62, a seal element 64 is included with a tubular 66 as being radially compressible or expandable and/or having a resilient member 68. For example, the member 68 could be a c-ring or other resilient or spring-like member that naturally springs, snaps, or otherwise returns back to its neutral position after being radially deformed. The seal element 64 in this embodiment is initially supported by a support member 70. In some embodiments, a secondary seal element 72 is included to seal the support member 70 to the tubular 66. The support member 70 could be removed in any desired manner in order to enable the seal element 64 and/or the member 68 to radially reposition the seal element 64 for disabling or disengaging the seal member 64.

In one embodiment the support member 70 is a frangible or breakable material, e.g., tempered glass, that is hit, punched, rammed, or otherwise struck or met by a force in order to shatter or break the support member. For example, a piston, pin, rod, finger, spike, etc. could be driven into the support member 68 using means such as hydraulics, pneumatics, string weight, etc. Similarly, a large compressive force could be increasingly applied over a relatively large surface area to crack or shatter the member 68.

In another embodiment, the support member 70 is made from controlled electrolytic metallic materials or some other material that can be degraded, dissolved, disintegrated, corroded, weakened, etc. (collectively, "degraded") by exposure to a predetermined fluid. Examples of suitable materials and their methods of manufacture are given in U.S. Patent Publication No. 2011/0135953 (Xu, et al.), which Patent Publication is hereby incorporated by reference in its entirety. Suitable materials are also available from Baker Hughes Incorporated under the name IN-TALLIC®. Other materials include magnesium, aluminum, etc. that are removable by exposure to acid, etc. The support member 70 could be at least partially hollow, perforated, weakened, etc. to aid in its removal.

Of course, any combination of elements from the above described embodiments, or substitutes, equivalents, analogs, etc. thereof or therefor are also within the scope of the current invention. In this way, triggering of some mechanism can be used to reconfigure the radial dimension of the seal element for selectively disabling or deactivating its seal sealing capability. Further, the tubular including the seal element can include a seal bore or other surface, e.g., the surface 18 in FIG. 1, for receiving a new seal element from another tubular such that additional operations requiring isolation, e.g., production, can be performed.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:
1. A downhole seal assembly comprising:
a first downhole tubular having a first sealing surface including a radially inner dimension;
a second downhole tubular having a second sealing surface including a radially outer dimension;
a seal element having an axial dimension run with the first tubular and being selectively radially shiftable towards the second sealing surface, the seal element having a radial innermost dimension to be sealed with the second tubular; and
a feature triggerable for selectively reconfiguring the radial dimension of the seal element while maintaining the axial dimension, wherein the seal element is selectively shiftable between a first position wherein the radial innermost dimension of the seal element is smaller than the radially inner dimension of the first downhole tubular, and a second position, wherein the radial dimension of the seal element is greater than the radially inner dimension of the first downhole tubular.

2. The assembly of claim 1, wherein the first downhole tubular is radially outwardly disposed with respect to the second downhole tubular and the seal element is an inverted seal element.

3. The assembly of claim 1, wherein the second downhole tubular has a slick diameter engagable by the seal element before triggering the feature.

4. The assembly of claim 3, wherein the second downhole tubular is a crossover tool.

5. The assembly of claim 1, wherein the feature is a property of the seal element to degrade upon exposure to a fluid and is triggered upon exposure of the seal element to the fluid.

6. The assembly of claim 1, wherein the feature is triggered by axial movement.

7. The assembly of claim 6, wherein the feature comprises a component mounted with the first tubular having a radially narrowed portion for receiving the seal element therein when axially aligned therewith.

8. The assembly of claim 7, wherein the component is a sleeve slidably mounted with respect to the first tubular.

9. The assembly of claim 7, wherein the seal element is slidably mounted with respect to the first tubular.

10. The assembly of claim 6, wherein the seal element is radially swaged.

11. The assembly of claim 1, wherein the feature comprises a temporary support for initially setting the radial dimension of the seal element as the radially innermost or outermost sealing dimension for the first tubular and triggering the mechanism involves removing the temporary support.

12. The assembly of claim 11, wherein the temporary support is frangible and triggering the mechanism involves breaking the temporary support.

13. The assembly of claim 11, wherein the temporary support is degradable upon exposure to a fluid and triggering the mechanism involves exposing the temporary support to the fluid.

14. The assembly of claim 11, wherein the seal element is secured to a resilient element for changing the radial dimension of the seal element after the temporary support has been removed.

15. A method of selectively sealing downhole tubulars comprising:
    sealing a seal element having an axial dimension against a second tubular, the seal element being supported by a first downhole tubular having a first sealing surface including a radially inner dimension;
    performing a downhole operation;
    disabling the seal element by selectively shifting the seal element while maintaining the axial dimension between a first position wherein a radial innermost dimension of the seal element is greater than the radially inner dimension of the first downhole tubular, and a second position, wherein the radial innermost dimension of the seal element is smaller than the radially inner dimension of the first downhole tubular so that it is no longer capable of sealing with the second downhole tubular; and
    pulling out the second downhole tubular.

* * * * *